(12) United States Patent
Ji et al.

(10) Patent No.: US 11,068,366 B2
(45) Date of Patent: *Jul. 20, 2021

(54) POWER FAIL HANDLING USING STOP COMMANDS

(71) Applicant: Western Digital Technologies, Inc., San Jose, CA (US)

(72) Inventors: YungLi Ji, Irvine, CA (US); Yuriy Pavlenko, Lake Forest, CA (US); Kum-Jung Song, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,945

(22) Filed: Jul. 26, 2019

(65) Prior Publication Data

US 2019/0347174 A1 Nov. 14, 2019

Related U.S. Application Data

(63) Continuation of application No. 15/610,423, filed on May 31, 2017, now Pat. No. 10,379,979.

(51) Int. Cl.
*G06F 11/00* (2006.01)
*G06F 11/20* (2006.01)
*G06F 12/0804* (2016.01)
*G06F 11/14* (2006.01)
*G06F 12/0868* (2016.01)

(52) U.S. Cl.
CPC ...... *G06F 11/2094* (2013.01); *G06F 11/1441* (2013.01); *G06F 12/0804* (2013.01);
(Continued)

(58) Field of Classification Search
CPC .. G06F 11/1088; G06F 11/1096; G06F 11/16; G06F 11/1612; G06F 11/1658;
(Continued)

(56) References Cited

U.S. PATENT DOCUMENTS

2002/0049924 A1* 4/2002 Kato .................. G06F 11/0757
714/5.11
2003/0188218 A1* 10/2003 Lubbers ............. G06F 11/2079
714/5.11
(Continued)

FOREIGN PATENT DOCUMENTS

CN 101996144 A 3/2011
CN 102043735 A 5/2011
(Continued)

*Primary Examiner* — Sarai E Butler
(74) *Attorney, Agent, or Firm* — Morgan, Lewis & Bockius LLP

(57) ABSTRACT

A device that provides power fail handling using command suspension includes non-volatile memory circuits and a controller that is configured to determine that a power fail event has occurred. The controller is configured to determine, in response to the determination that the power fail event has occurred, which of the non-volatile memory circuits are executing a first type of memory commands. The controller is also configured to issue a stop command to the determined non-volatile memory circuits to stop execution of the first type of memory commands.

20 Claims, 4 Drawing Sheets

(52) U.S. Cl.
CPC .... *G06F 12/0868* (2013.01); *G06F 2201/805* (2013.01); *G06F 2201/82* (2013.01); *G06F 2212/1032* (2013.01); *G06F 2212/205* (2013.01); *G06F 2212/222* (2013.01); *G06F 2212/313* (2013.01); *G06F 2212/7204* (2013.01); *G06F 2212/7208* (2013.01)

(58) Field of Classification Search
CPC .. G06F 11/1666; G06F 11/20; G06F 11/2094; G06F 11/0751; G06F 11/2015; G06F 11/0727; G06F 11/073; G06F 11/1008; G06F 11/2053
USPC .................................. 714/6.3, 1–57
See application file for complete search history.

(56) References Cited

U.S. PATENT DOCUMENTS

| | | | |
|---|---|---|---|
| 2005/0108491 A1 | 5/2005 | Wong | |
| 2007/0245059 A1* | 10/2007 | Tjia | G06F 13/4027 710/313 |
| 2008/0141222 A1* | 6/2008 | Alpern | G06F 11/362 717/125 |
| 2009/0198931 A1 | 8/2009 | Ohyama | |
| 2010/0299558 A1 | 11/2010 | Tojo | |
| 2013/0179614 A1* | 7/2013 | Ross | G06F 13/385 710/264 |
| 2013/0346793 A1 | 12/2013 | Flynn | |
| 2015/0100817 A1* | 4/2015 | Alshinnawi | G06F 11/004 714/3 |
| 2015/0193299 A1* | 7/2015 | Hyun | G11C 29/52 714/6.24 |
| 2017/0123994 A1* | 5/2017 | Pandya | G06F 12/10 |
| 2017/0147169 A1* | 5/2017 | Takahashi | H04N 1/00411 |
| 2017/0185335 A1 | 6/2017 | Pardoe | |
| 2017/0249084 A1* | 8/2017 | Gray | G06F 3/064 |
| 2017/0315889 A1 | 11/2017 | Delaney | |

FOREIGN PATENT DOCUMENTS

| | | |
|---|---|---|
| CN | 106328059 A | 1/2017 |
| CN | 106575271 A | 4/2017 |

* cited by examiner

POWER FAIL HANDLING USING STOP COMMANDS

CROSS-REFERENCE TO RELATED APPLICATION

This application is a continuation application of application Ser. No. 15/610,423, filed May 31, 2017, now U.S. Pat. No. 10,379,979, the entirety of which is incorporated herein by reference.

TECHNICAL FIELD

The present description relates generally to data transfer within data storage devices including power fail handling using stop commands for non-volatile memory devices.

BACKGROUND

Solid state storage devices using flash memory provide performance and power consumption advantages over conventional hard drives. To further improve performance, many solid state storage devices are incorporating and using volatile memory, such as random access memory (RAM), in addition to flash memory. For example, volatile memory may be used to cache data and/or temporarily store system data used to manage the data stored in flash memory. Unlike flash memory, however, volatile memory requires power to maintain the data stored therein. If power is interrupted, any data stored in volatile memory may be lost. This data loss may increase overhead operations in a solid state storage device by requiring lost tables to be reconstructed. Furthermore, this data loss may result in permanently losing cached data that had not been stored in flash memory prior to the power interruption.

SUMMARY

The disclosed subject matter relates to a data storage device that includes a mechanism for a controller to suspend certain flash memory operations when a power fail event occurs. After the power fail event occurs, there is a limited amount of time to preserve system data, and in some cases, host data in non-volatile memory. The controller may be configured to issue certain data preservation commands such as write commands to store the system data after it has determined that a power fail event has occurred. The controller may be configured to first detect whether any unnecessary memory commands are being executed when the power fail event was detected. The controller may be configured to issue a stop command to non-volatile memory circuits (e.g., flash memory) to stop the execution of the detected memory commands so that more non-volatile memory becomes readily available and the data preservation commands can be issued instead.

In another aspect, a data storage device includes non-volatile memory circuits and a controller. In an aspect, the controller is configured to determine that a power fail event has occurred. The controller is also configured to determine, in response to the determination that the power fail event has occurred, which of the non-volatile memory circuits are executing a first type of memory commands. The controller is also configured to issue a stop command to the determined non-volatile memory circuits to stop execution of the first type of memory commands.

In another aspect, a system includes a plurality of flash memory circuits, a random access memory (RAM), and a controller communicatively coupled to the plurality of flash memory circuits. In an aspect, the controller is configured to determine that a power fail event has occurred. The controller is also configured to determine, in response to the determination that the power fail event has occurred, which of the plurality of flash memory circuits are executing an erase command or a program command. The controller is also configured to stop execution of either the erase command or the program command based on a stop command being issued to the determined flash memory circuits.

In another aspect, a method includes determining that a power fail event has occurred. The method also includes determining, in response to the determination that the power fail event has occurred, which flash memory circuits in a data storage device are executing an erase command or a program command. The method also includes issuing a stop command to the determined flash memory circuits to terminate the erase command or to suspend the program command.

In another aspect, a system includes means for determining that a power fail event has occurred in flash storage. The system also includes means for determining, in response to the determination that the power fail event has occurred, which flash memory circuits in a data storage device are executing an erase command or a program command. The system also includes means for issuing a stop command to the determined flash memory circuits to terminate the erase command or to suspend the program command.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
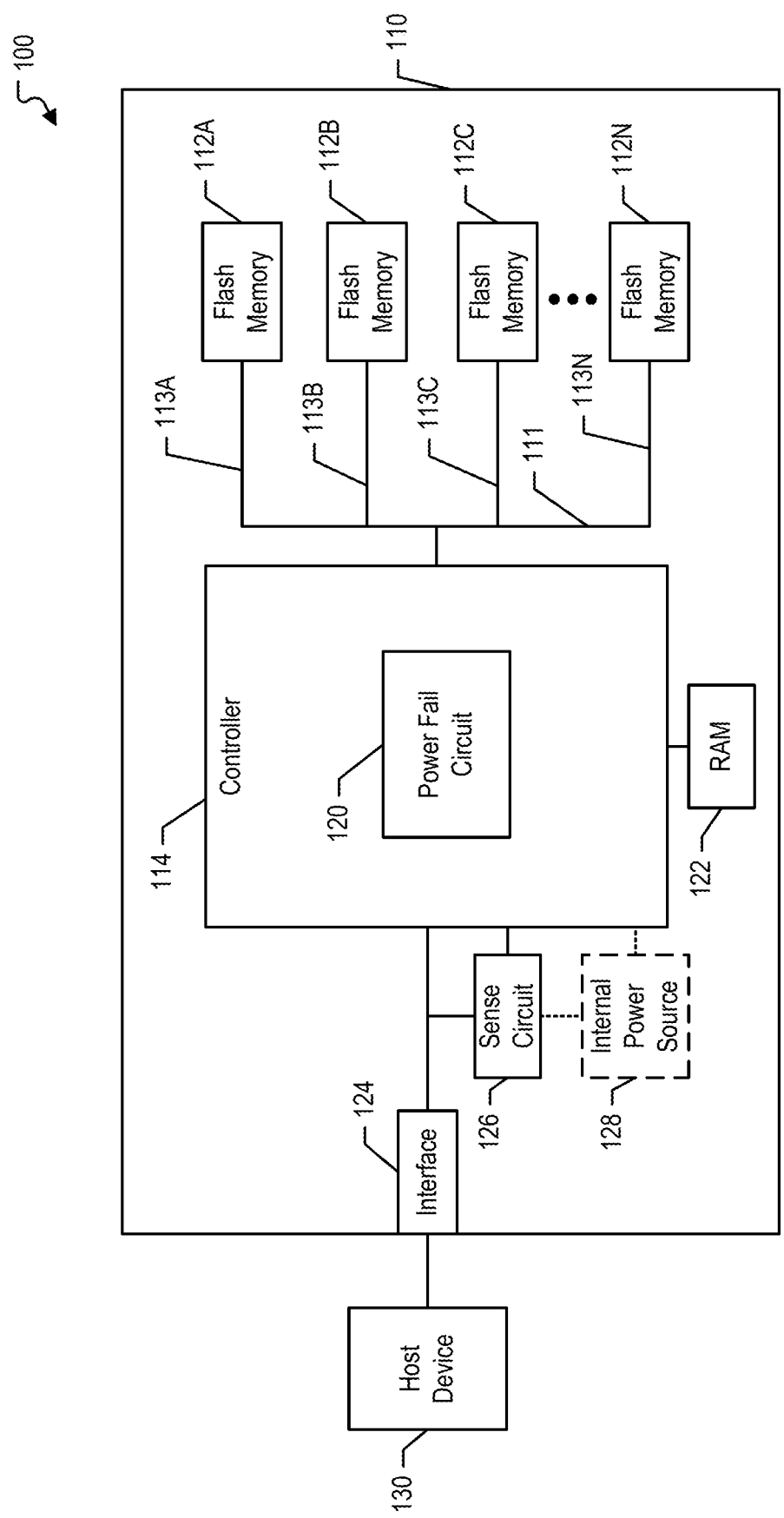
FIG. 1 illustrates an example data storage system that may implement a system for power fail handling using stop commands in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Handling a power fail event in solid state storage devices that uses flash memory poses a significant challenge when there is a limited amount of time after the event to preserve system data and/or host data stored in volatile memory. As used herein, the term "system data," for example, refers to data for managing the data storage device including, but not limited to, a host logical block number (LBN) to physical block (e.g., NAND block) address mapping index, a second layer index to the host LBN to physical block address mapping index, boot-up information, physical block attributes (e.g., erased, waiting to be erased, in programming, programming complete), change log information, host table information, listing of available physical blocks, write/erase counts, and garbage collection metrics. As used herein, the term "host data," for example, refers to data received from and/or transmitted to a host including data being moved internally. The subject technology relates to two different scenarios that face this challenge of data preservation after a power fail event. A first scenario includes an on-board capacitor or battery source that provides power to cease existing memory commands, to issue a number of write commands to non-volatile memory devices and to complete execution of such write commands to preserve system data and/or certain host data after a power fail event. A second scenario, where an on-board capacitor or battery source may not be available, may not have time to issue write commands to preserve system data stored in volatile memory after a power fail event. Rather, the amount of power remaining after the power fail event allows for prioritizing which write commands to initiate and which write commands to terminate in order to place the non-volatile memory in a stable state before the power is completely lost.

When handling a power fail event with on-board (or internal) power supply circuitry such as a capacitor or a battery, system data and certain host data (e.g., host data acknowledged back to host) stored in volatile memory such as RAM ideally is preserved before the power is completely lost. The host data may be data received from the host and acknowledged by the data storage device for storage in non-volatile memory. The on-board power supply circuitry does not provide unlimited power, so any write commands that are issued to preserve existing system data and/or host data may need to be completed as soon as possible. A first type of memory commands such as erase and program commands (e.g., non-acknowledged host data to be written) include relatively long execution sequences and, therefore, require the most amount of time to complete. These first type of commands are not ideal to perform after a power fail event. In this respect, the erase and program commands are not critical and thus unnecessary to execute when there is a need to execute write commands directed to storing system data after a power fail event. For example, when erase or program commands are executing and a power fail event has occurred, there may be time lost in running these types of commands that are not likely to be completed or executed correctly.

When handling a power fail event without on-board (or internal) power supply circuitry, the objective shifts to protect the cells of a non-volatile memory device by setting the cells to a stable state before power is completely lost. Power fail events may occur in different environments. For example, when a data storage device attaches to (or connects to) a host device (e.g., a computer) and the host device is losing power, this power fail event may involve a relatively longer period of time for the supply voltage level to drop below an operating voltage of the data storage device. In another example, when the data storage device is forcibly detached from the host device, this power fail event may involve a relatively shorter period of time for the voltage to drop below the operating voltage of the data storage device. The subject technology provides for protecting the cells of the non-volatile memory devices in a consistent manner, so that the non-volatile memory device can be recovered in a consistent manner in a next boot-up sequence.

In one or more implementations, when handling a power fail event with on-board (or internal) power supply circuitry, a controller of the data storage device sends a stop command such as an erase stop command or a program stop command to a particular non-volatile memory device that is identified to be executing an erase command or a program command, respectively. The non-volatile memory device in receipt of the stop command suspends execution of the erase or program commands in a relatively short period of time, and awaits a new command from the controller. When the first type of commands (e.g., erase command, program command) are suspended, the controller can execute a second type of memory commands (e.g., write commands directed to storing system data) on any available non-volatile memory devices to complete the power fail handling process in less time. Because the on-board power supply circuitry does not provide an unlimited power supply when power from the host is faltering, the data storage device uses the remaining power for data preservation instead of non-critical memory operations.

In one or more implementations, the stop commands are issued by hardware or firmware depending on implementation. The stopped commands (e.g., erase command, program command) may be re-executed in a next boot-up sequence. The power fail handling activities for data preservation may include write commands that are specific to storing system data and/or acknowledged host data to non-volatile memory. These write commands may include a write command to save (or store) an index of data associated with the non-volatile memory device. The write commands also may include a write command to store an erase count of a given physical block for a non-volatile memory device. The write commands also may include a write command to store characteristics of a given physical block for a non-volatile memory device such as a number of instances that the physical block has been erased, has been written to, or the like. The write commands also may include a write command to store host payload data, where that data has already been acknowledged to the host by the data storage device. The data stored in response to the issued data preservation commands can be used for a next recovery boot-up sequence.

When handling a power fail event without on-board (or internal) power supply circuitry, the controller sends a stop command to a particular non-volatile memory device to suspend an executing erase or program command at that device. During the power fail event, the supply voltage drops at a rate that may be unstable or unpredictable such that the amount of time remaining to store existing system data into non-volatile memory is unknown. The program command may not properly execute due to an insufficient amount of charge being applied to the cells of the non-volatile memory device. For example, the voltage levels for each programming cycle or erase cycle in a multi-level cell (MLC) or triple-level cell (TLC) may not be applied to the proper levels, thus causing the cells to be charged (for program) or discharged (for erase) incompletely. The non-volatile memory device in receipt of the stop command suspends any execution of the erase or program commands in a relatively short period of time. In this respect, the stop commands can be completed before the voltage drops below the operating voltage of the non-volatile memory device, and keeps the cells of the non-volatile memory device in a stable state.

The subject technology provides for a data storage device that includes non-volatile memory circuits and a controller. In one or more implementations, the controller determines that a power fail event has occurred. The controller then determines, in response to the determination that the power fail event has occurred, which of the non-volatile memory circuits are executing a first type of memory commands. The controller then issues a stop command to the determined non-volatile memory circuits to stop execution of the first type of memory commands. The non-volatile memory circuits may resume execution of suspended write (or program) commands upon receipt of a new command (e.g., a resume command) from the controller or may commence execution of an erase command on a physical block in a stable state upon receipt of a subsequent erase command from the controller.

FIG. 1 illustrates an example data storage system 100 that may implement a system for power fail handling using command suspension in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The system 100 includes a data storage device 110 and a host device 130. The data storage device 110 includes a bus 111, one or more flash memory circuits 112A-N, one or more channels 113A-N, a controller 114, a random access memory (RAM) 122, an interface 124 and a sense circuit 126. The controller 114 includes a power fail circuit 120. The controller 114 may include one or more decoders (not shown), such as error-correcting code (ECC) decoders, one or more encoders (not shown), such as ECC encoders. The one or more decoders and/or the one or more encoders may be one or more dedicated circuits of the controller 114, may be implemented via firmware running on the controller 114, and/or may be one or more circuits separate from the controller 114. As used herein, the term "flash memory circuit" may be used interchangeably with the term "non-volatile memory device."

The power fail circuit 120 processes a sense circuit signal from the sense circuit 126 that may indicate whether a power failure event has occurred. In one or more implementations, the power fail circuit 120 determines whether the power fail event has occurred based on the sense circuit signal. The power fail circuit 120 may issue a stop command to one or more of the flash memory circuits 112A-N in response to the sense circuit signal. The power fail circuit 120 may issue an erase stop command to terminate execution of an existing erase command. The power fail circuit 120 may issue a program stop command to either suspend an existing program command to be resumed at a later time when power is restored or terminate an existing program command. In some aspects, the controller 114 includes one or more logic circuits that issue standard read/write commands during run time (or normal operation). In this respect, these logic circuits may be configured to issue the stop command to the one or more of the flash memory circuits 112A-N based on a state of the sense circuit signal. In one or more aspects, the logic circuits may process the sense circuit signal from the sense circuit 126 in some implementations, or may receive an indication from one or more processing cores of the controller 114 to trigger the issuance of the stop command. For example, the one or more logic circuits may issue standard read/write commands during run time when the sense circuit signal is in a first logical state ("0"), and issue the stop command during a power fail event when the sense circuit signal is in a second logical state ("1"). The logic circuits may be separate from the power fail circuit 120 in some implementations, or may be a sub-component of the power fail circuit 120 in other implementations.

The interface 124 of the data storage device 110 couples the data storage device 110 to the host device 130. The interface 124 may be a wired interface, such as a Peripheral Component Interface Controller (PCIC) interface, a Personal Computer Memory Card International Association (PCMCIA) interface, a Serial AT Attachment (SATA) interface, a universal serial bus (USB) interface, or generally any wired interface. Alternatively, or in addition, the interface 124 may be a wireless interface, such as wireless SATA, Bluetooth, or generally any wireless interface.

The sense circuit 126 is coupled to the interface 124 and to the controller 114. The sense circuit 126 may be a voltage detector in some implementations, or a current detector in other implementations. The sense circuit 126 measures the power supply levels (e.g., voltage amplitude, current amplitude) from the host device 130 to determine whether a power fail event has occurred. In some aspects, the sense circuit 126 may measure power supply levels from other external power sources (other than the host device 130). If the power supply levels from the host device 130 drop below a predetermined threshold (e.g., 10%, 20% drop), then the sense circuit 126 may issue a notification (e.g., a sense circuit signal) to the controller 114 indicating that the power failure event has occurred.

In one or more implementations, the system 100 includes an internal power source 128 to supply supplemental power to the controller 114 and to the non-volatile memory devices (e.g., flash memory circuits 112A-N) during a power fail event. The internal power source 128 may be coupled to the sense circuit 126 and to the controller 114. The internal power source 128 includes a passive electrical circuit (e.g., capacitor) in some implementations, or includes a battery in other implementations.

The channels 113A-N may be coupled to the bus 111 and the channels 113A-N may each communicatively couple one or more of the flash memory circuits 112A-N to the controller 114 by way of the bus 111. In one or more implementations, the channels 113A-N may be directly coupled to the controller 114, e.g., without the bus 111. The channels 113A-N and/or the bus 111 may be wired interfaces.

In the system 100, the channel 113A is communicatively coupled to the flash memory circuit 112A, the channel 113B is communicatively coupled to the flash memory circuit 112B, the channel 113C is communicatively coupled to the flash memory circuit 112C, and the channel 113N is communicatively coupled to the flash memory circuit 112N.

Although the channels 113A-N are illustrated in the system 100 as each being communicatively coupled to one of the flash memory circuits 112A-N, each of the channels 113A-N may be communicatively coupled to multiple of the flash memory circuits 112A-N as is discussed further below with respect to FIG. 2. When multiple of the flash memory circuits 112A-N are coupled to a single one of the channels 113A-N, only one of the flash memory circuits 112A-N may be able to transmit or receive data over the channel at any given time.

The bus 111 and/or the channels 113A-N may each be associated with a maximum bandwidth and/or throughput. Similarly, the interface 124 may also be associated with a maximum bandwidth and/or throughput. Thus, there may be bandwidth/throughput limitations on the amount of data that can be transferred over the bus 111 and/or over each of the channels 113A-N at any given time. Furthermore, each of the flash memory circuits 112A-N may only be capable of processing a single command, e.g. a write command or a read command, at any given time.

The controller 114 may be operable to read data from, and write data to, the flash memory circuits 112A-N via the channels 113A-N and the bus 111. For example, the controller 114 receives data, such as a stream of data, from the host device 130 via the interface 124, where the data may be then written to one or more of the flash memory circuits 112A-N via the bus 111 and one or more of the channels 113A-N. The flash memory circuits 112A-N may each include one or more physical blocks, such as NAND blocks and/or NOR blocks. The physical blocks may each include one or more physical pages to which data may be written to or read from.

The controller 114 may utilize the RAM 122 to queue system data and/or host data that are intended to be stored in the flash memory circuits 112A-N. For example, the RAM 122 may be used as a buffer for rate control, or may otherwise be used to store information (e.g., queues, variables, physical block status, logical to physical address mapping tables, endurance/retention data, settings, etc.) utilized by the controller 114 to read/write data to/from the flash memory circuits 112A-N. Since the RAM 122 may be volatile memory, the controller 114 may write from the RAM 122 to the flash memory circuits 112A-N to permanently store information in one or more of the flash memory circuits 112A-N. When the data storage device 110 is powered on, the controller 114 may retrieve the information from the one or more flash memory circuits 112A-N and store the information in the RAM 122.

Although the physical pages of the physical blocks of the flash memory circuits 112A-N can be individually written to (e.g., a physical page being a unit for read/write operations), the physical pages of a physical block of the flash memory circuits 112A-N cannot be individually erased. Instead, a physical page of a physical block can only be erased, and subsequently rewritten to, by erasing all of the physical pages of the physical block (e.g., a physical block being a unit for erase operations). Thus, as data is moved from a page of a physical block, or the data is deleted, the page may be marked invalid and cannot be reused until the entire physical block is erased.

If an erase command is issued to a non-volatile memory device (e.g., one of the flash memory circuits 112A-N) and a power fail event occurs, the length of time to complete the erase command (e.g., about 10 to 20 milliseconds) may not be sufficient because the internal power source 128 (e.g., a backup battery or capacitor) may not have an adequate supply of power to apply to the non-volatile memory device.

In some cases when a power fail event occurs, a program command that is being executed on a non-volatile memory device (e.g., one of the flash memory circuits 112A-N) may be suspended at an arbitrary step in the programming sequence. In this respect, the cells of a page may not be charged to the desired program levels, thus causing a subsequent read operation from that page to be invalid due to the programming of the page becoming corrupted after the power fail event.

When a non-volatile memory device (e.g., one of the flash memory circuits 112A-N) is in a ready state, the controller 114 can issue a write command in order to store system data and/or data from a host that has been acknowledged by the controller 114. For example, when a host sends a program command or a write command to the data storage device 100, and the controller 114 has acknowledged the command from the host by sending an acknowledgment signal back to the host, then the operation to write the host data is considered complete. In this respect, the host data associated with the acknowledged program (or write) command becomes a higher priority operation to complete before power is lost in the data storage device. In some cases, the host data sent from the host is temporarily stored in volatile memory such as a local cache, thus the importance of writing the host data from the volatile memory to the non-volatile memory device increases.

To increase the likelihood of successfully completing write operations to the non-volatile memory device for data preservation after a power fail event, the subject technology provides for issuing a stop command (e.g., suspending existing unnecessary (or less important) write or erase commands) to the non-volatile memory devices. Issuing the stop commands can free up additional non-volatile memory devices for moving any existing system data from the volatile memory to non-volatile memory before the voltage drops below the operating voltage of the non-volatile memory device. In one or more implementations, the stop commands are relatively short in length such as including a relatively small payload or control information overhead, thus producing a relatively small amount of latency in processing time to transition the non-volatile memory device into a suspend state.

When a stop command is issued to stop a non-critical program command in a non-volatile memory device, the cells of a physical page in a physical block for the non-volatile memory device may not be fully programmed. This is because a program command may include multiple cycles (or a sequence of cycles) to complete the programming of the physical page, where the voltage applied to each individual cell may be increased (or raised) to a certain voltage level with each cycle. In some aspects, the program command may include a duration of a few microseconds to complete. In this respect, a stop command issued to the non-volatile memory device suspends the program command, thus resulting in the cell charge levels not being raised to the desired levels for programming the physical page. The data that may be read from the page affected by the suspended program command would likely be corrupted data (or data with errors) since the cells were not charged to the correct levels to store the correct data values. In some aspects, when a program command is stopped intermittently (or before completion), the data to be programmed (or written) into the non-volatile memory device remains in a local cache (or preload registers) of the non-volatile memory device. Unless the non-volatile memory device can retain data in a suspend state, the data already stored in the preload registers would be lost and the stopped (or suspended)

program command may not be recoverable. For example, the controller 114 sends a write command to one of the non-volatile memory devices, and it loads the data to with a set of preload registers for the non-volatile memory device. The controller 114 may then initiate a sequence of programming cycles to write the data from the set of preload registers to the non-volatile memory device. When the non-volatile memory device receives a stop command from the controller 114, the programming operation may be suspended at an arbitrary point in the sequence of programming cycles with the cells of a physical page at arbitrary programmed levels. The preload registers may be cleared after a power fail event, thus causing a loss of data for a subsequent program operation.

Similarly in an erase operation, the erase command may include multiple cycles to discharge the cells in a physical block. In some aspects, the erase command may include a duration of a few milliseconds to complete. If an erase command is suspended intermittently (or before completion), then a number of cells may still contain some charge. In this respect, when subsequent write operations are performed on the cells that were not completely discharged during an erase operation, the cells being written to may not be charged to the expected levels due to the remnant charges in the cells. This may then cause errors during a read operation.

In one or more implementations, when a stop command is issued to a specific non-volatile memory device of a die or a package that includes multiple non-volatile memory devices, the specific non-volatile memory device in that die or plane is suspended and becomes unavailable to perform any write operations. Other non-volatile memory devices belonging to that die or plane are available for use after the stop command issued to the specific non-volatile memory device is complete. For example, a new command such as a read command or erase command may be issued to the remaining non-volatile memory devices. However, a new program command may not be issued to the same die or plane that received the program stop command. Rather, the new program command may be sent to another die or plane to perform write operations that store the system data and/or acknowledged host data in non-volatile memory.

In one or more implementations, programming operations occurring in more than one non-volatile memory device can occur in parallel. In this respect, a stop command would be issued to a specific non-volatile memory device where an unnecessary programming operation is occurring. In some aspects, a separate stop command is issued to each non-volatile memory device where an unnecessary programming or erasing operation is occurring. For example, a non-volatile memory device package that contains four non-volatile memory devices may have programming operations occurring concurrently, in which four individual stop commands are then issued individually to each of the four non-volatile memory devices.

In one or more implementations, the format of a stop command issued to suspend an erase operation (or an erase stop command) and the format of a stop command issued to suspend a program operation (or a program stop command) are different. In some aspects, the erase stop command represents a reset command. In this aspect, there is a predetermined prefix in the erase stop command to restart the stopped erase operation. Similarly, there is a predetermined prefix in the program stop command to restart the stopped program operation. In this respect, the stop command used to suspend the program command is a special command because suspending the program command using a similar stop command as that of the erase stop command may completely cancel the program command without the ability to resume the stopped program command at a later time (or boot-up cycle).

In one or more implementations, a program stop command is issued to a specific non-volatile memory device by the controller 114. The controller 114 performs a status poll of a non-volatile memory device of a die or plane after issuing the program stop command to the non-volatile memory device to determine whether the non-volatile memory device entered into a stop (or suspend) state for program commands or a terminate state for erase commands. If the non-volatile memory device entered into the suspend state, then the controller 114 may issue another command such as an erase command or a read command to other non-volatile memory devices belonging to other dies or planes. To resume the stopped program command, the controller 114 can issue the special program command that includes a predetermined prefix indicating a request to resume the stopped program command. In this respect, a non-volatile memory device in the suspend state can be transitioned from the suspend state back to a programming state based on the subsequent program command. In regard to erase commands, the controller 114 issues either a reset command or an erase stop command to stop the erase operation from occurring. The controller 114 then monitors the status poll from the non-volatile memory device to detect a ready signal. Upon detecting the ready signal, the controller 114 may resume the stopped erase command by issuing a same erase command to a same address in the non-volatile memory device (e.g., an address pointing to a physical block of the non-volatile memory device). In this respect, a non-volatile memory device in the terminate state can be transitioned from the terminate state back to an erase state based on the subsequent erase command.

In one or more implementations, a voltage detector (e.g., the sense circuit 126) monitors the power being supplied to the controller 114 and to the non-volatile memory devices. The voltage detector may be configured to detect a predetermined operating voltage (e.g., 3.3 V, 2.5 V, 1.8 V) with respect to a predetermined threshold. The predetermined threshold may correspond to a percentage of the power supply voltage (e.g., 90%). For example, if the power supply voltage drops by at least 10% (or below the 90% threshold), the voltage detector issues an alert signal (e.g., the sense circuit signal) that triggers the controller 114 to issue a stop command to the non-volatile memory devices.

Figure 2:
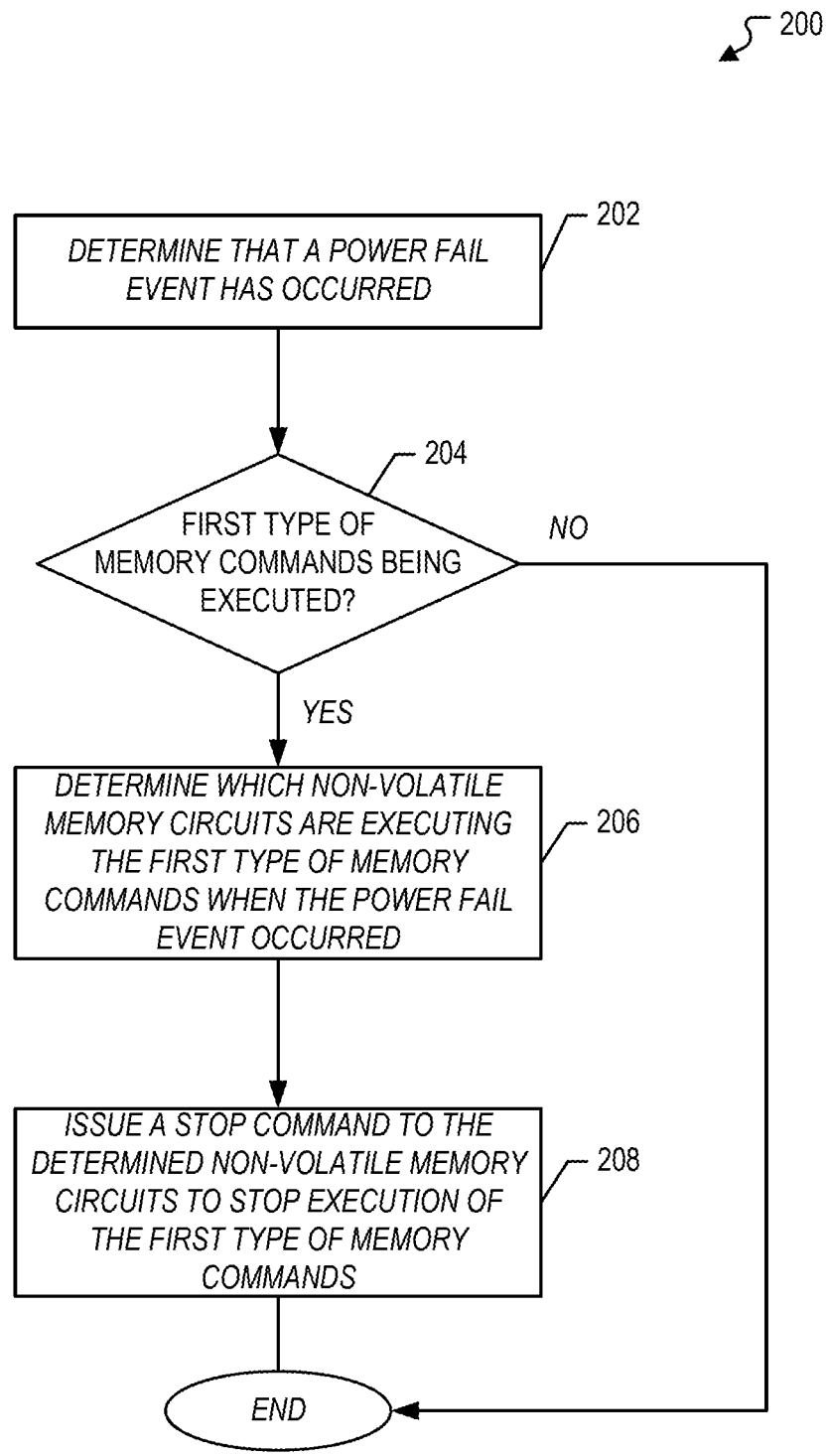
FIG. 2 illustrates a flow diagram of an example process of power fail handling using stop commands in accordance with one or more implementations.

FIG. 2 illustrates a flow diagram of an example process 200 of power fail handling using command suspension in accordance with one or more implementations. For explanatory purposes, the example process 200 is described herein with reference to the controller 114 of FIG. 1; however, the example process 200 is not limited to the controller 114 of FIG. 1, and one or more blocks of the example process 200 may be performed by one or more other components of the controller 114. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

The example process 200 begins, at step 202, when the controller 114 (FIG. 1) of the data storage device 110 determines that a power fail event has occurred. For example, the controller 114 may receive a sense circuit signal from the sense circuit 126 indicating that a voltage monitored at the interface 124 has dropped by about 10% (e.g., from 5.0V to 4.5 V), and the power supply from the host device 130 is, therefore, at or below a first threshold to denote the power fail event. In this approach, the sense circuit 126 may not need to detect the voltage at the flash memory circuits 112A-N in order to trigger the power fail event. In another aspect, the sense circuit signal from the sense circuit 126 may indicate that there is insufficient power to operate the flash memory circuits 112A-N based on a second threshold, where the second threshold is below the power supply level of the flash memory circuits by a predetermined percentage (e.g., 10%). For example, the sense circuit 126 may detect the voltage at the flash memory circuits 112A-N to trigger the power fail event, where the detected voltage may have dropped from a 3.3V power supply to about 3.0V. In this example, the second threshold corresponds to the 3.0V level and is greater than the minimum operating voltage of the flash memory circuits 112A-N (e.g., 2.7V). In this respect, the power fail event is triggered before the voltage level reaches the minimum operating voltage, not when the voltage level has dropped below the minimum operating voltage.

In some aspects, the non-volatile memory circuits 112A-N are powered by the internal power source 128 when the power fail event has occurred. The sense circuit signal may trigger the internal power supply 128 to supply power to the controller 114. In this respect, the controller 114 writes data from a volatile memory such as the RAM 122 to the non-volatile memory circuits (e.g., 112A-N) before the power from the internal power source 128 drops below a predetermined threshold.

In step 204, the controller 114 determines whether first type of memory commands (e.g., write commands and/or erase commands) are being executed on the non-volatile memory circuits 112A-N. For example, the controller 114 may have visibility of command queues to know which non-volatile memory device or grouping of non-volatile memory devices are executing the first type of memory commands. If the controller determines there are write commands and/or erase commands being executed, then the process 200 proceeds to step 206. Otherwise, the process 200 terminates. In some aspects, the first type of memory commands include erase commands. In other aspects, the first type of memory commands include program commands for writing a first type of data. The first type of data may include non-acknowledged host data.

The first type of data also may include parity data. For example, the controller 114 may implement a RAID (Redundant Array of Inexpensive Disks) storage scheme across the flash memory circuits 112A-N. A bitwise function, such as an XOR function, may be executed on a set of host data to generate parity data that is written to the flash memory circuits 112A-N along with the set of host data. Should a first type of memory command for writing parity data be suspended or terminated upon a power fail event, the parity data may be recalculated from the set of host data following the next boot up of the data storage device and written to the flash memory circuits 112A-N.

In step 206, the controller determines which non-volatile memory circuits (e.g., 112A-N) are executing the first type of memory commands by referring to the command queues when it is determined that the power fail event has occurred. In step 208, the controller issues a stop command to the determined non-volatile memory circuits to suspend or terminate execution of the first type of memory commands.

In one or more implementations, the controller 114 issues second type of memory commands to the determined non-volatile memory circuits. In some aspects, the second type of memory commands include program commands for writing a second type of data. The second type of data may be system data and/or acknowledged host data.

In one or more implementations, the stop command includes a suspend command to suspend the execution of the first type of memory commands. In this respect, suspended first type of memory commands may be resumed in response to a subsequent command from the controller 114. In other implementations, the stop command includes a terminate command to terminate execution of the first type of memory commands, such that the terminated commands may not be resumed or recoverable in a subsequent write command from the controller 114.

Figure 3:
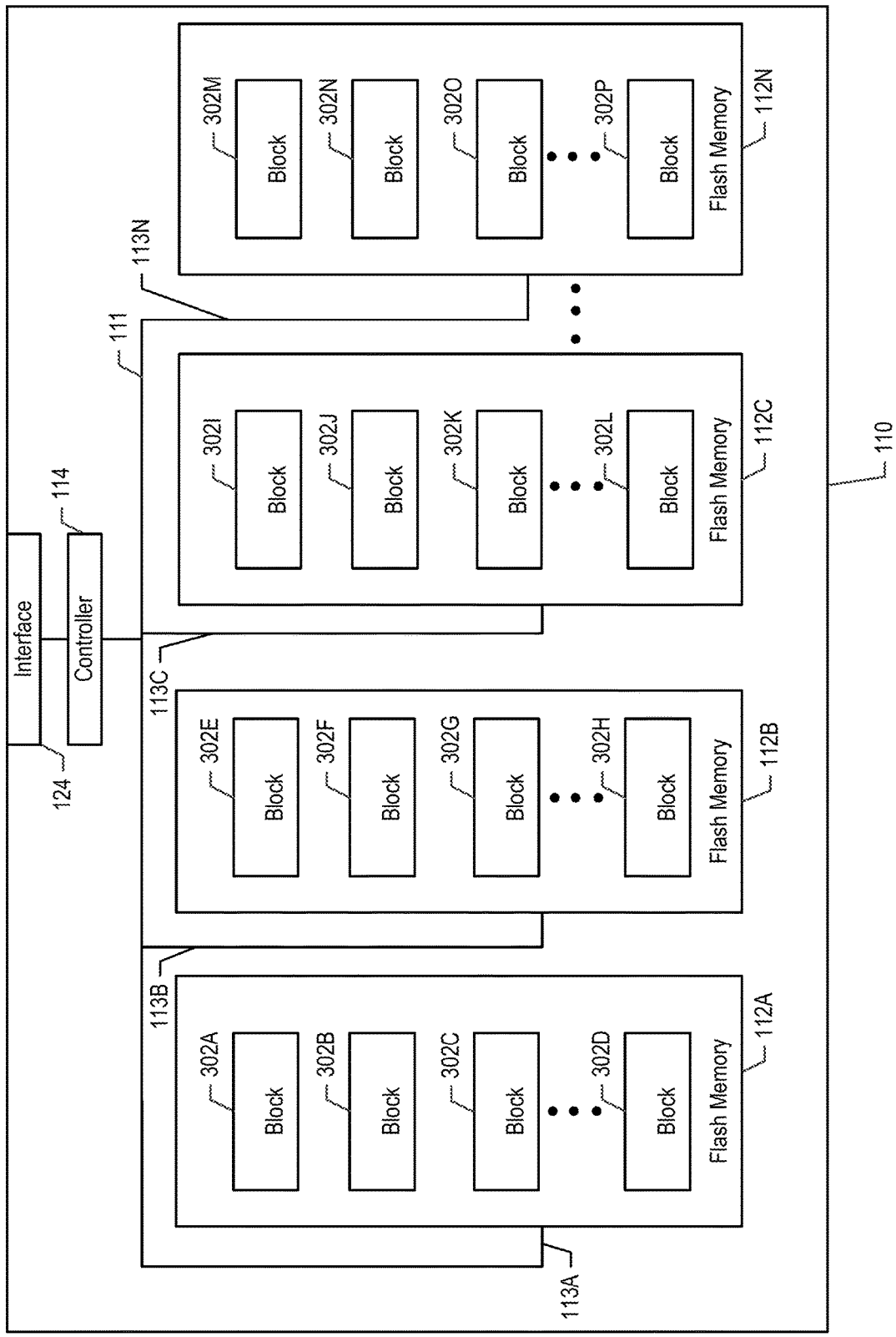
FIG. 3 illustrates example non-volatile memory circuits distributed across different channels in an example data storage device in accordance with one or more implementations.

FIG. 3 illustrates example non-volatile memory circuits distributed across different channels in an example data storage device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example data storage device 110 includes the interface 124, the controller 114, the bus 111, the channels 113A-113N, and one or more flash memory circuits 112A-N. The flash memory circuits 112A-N each include one or more physical blocks (e.g., 302A-P) of flash memory, which may also be referred to as blocks and are discussed further below with respect to FIG. 4.

As shown in FIG. 3, the channel 113A couples the flash memory circuits 112A to the bus 111, the channel 113B couples the flash memory circuits 112B to the bus 111, the channel 113C couples the flash memory circuits 112C to the bus 111, and the channel 113N couples the flash memory circuits 112N to the bus 111. However, after the flash memory circuit 112A receives the data, the flash memory circuit 112A may be in a busy state during which the flash memory circuit 112A may not receive any additional read and/or write commands. Thus, the number of the flash memory circuits 112A-N that are simultaneously in the busy state may limit the data storage device 110. The other channels 113B-N may operate in a similar fashion.

For explanatory purposes, the data storage device 110 of FIG. 3 is illustrated as including four channels 113A-N, and each of the channels 113A-N is illustrated as being communicatively coupled to the flash memory circuits 112A-N. However, the data storage device 110 may include any number of channels, such as 8, 16, 32. Similarly, each of the channels 113A-N may be communicatively coupled to any number of the flash memory circuits 112A-N, such as an arbitrary number. In one or more implementations, one or more of the channels 113A-N may be communicatively coupled to different numbers of the flash memory circuits 112A-N.

Figure 4:
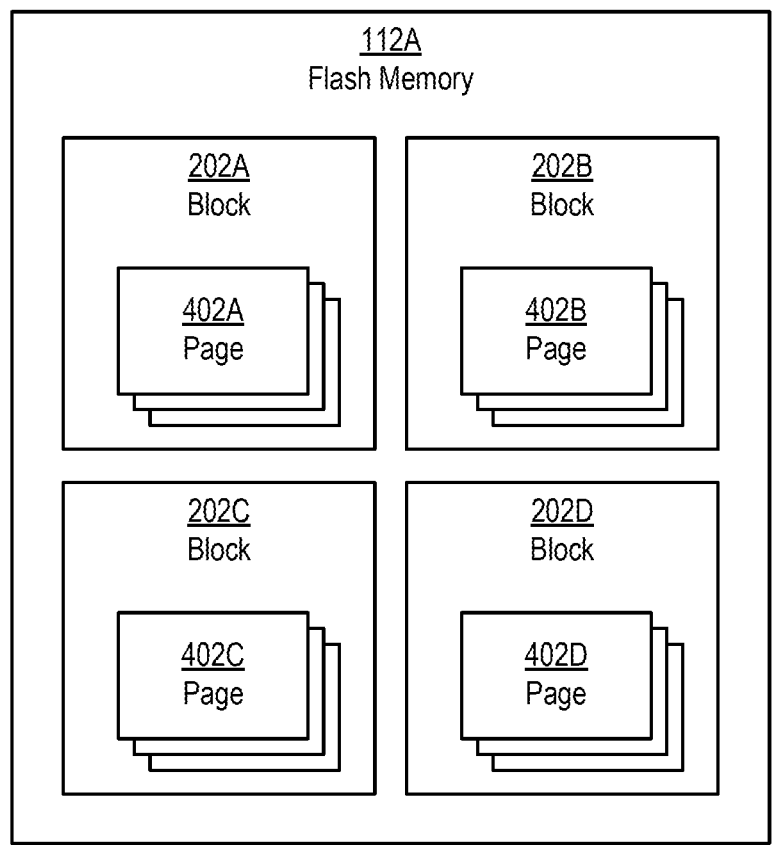
FIG. 4 illustrates example blocks of non-volatile memory circuits distributed across different channels in an example data storage device in accordance with one or more implementations.

FIG. 4 illustrates example blocks of non-volatile memory circuits distributed across different channels in an example data storage device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the data storage device 110 of FIG. 3 is illustrated as including a flash memory circuit 112A. The flash memory circuits 112A includes one or more physical blocks 202A-D of flash memory, which may also be referred to as blocks 202A-D. Each of the physical blocks 202A-D may include one or more physical pages 402A-D of flash memory. The individual physical pages 402A-D of the physical blocks 202A-D may be the smallest unit that can be written to in the flash memory circuits 112A-N and may be, for example, 8-16 kilobytes in size. In one or more implementations, a flash memory circuit 112A may be 16 Gigabytes in size and may include 4,252 blocks each of which includes 256 pages with each page storing 17,760 bytes.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an implementation, the implementation, another implementation, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A machine-implemented method, comprising:
   detecting whether a power fail event is triggered; and
   responsive to the power fail event being triggered:
      determining that at least one non-volatile memory device among a plurality of non-volatile memory devices is executing a non-critical memory command; and
      issuing a suspend or terminate command, to the determined at least one non-volatile memory device among the plurality of non-volatile memory devices, to suspend or terminate execution of the non-critical memory command.

2. The machine-implemented method of claim 1, wherein the non-critical memory command comprises an erase command or a program command for writing a first type of data.

3. The machine-implemented method of claim 2, wherein the first type of data comprises non-acknowledged host data.

4. The machine-implemented method of claim 1, further comprising:
   after issuance of the suspend or terminate command, issuing a data preservation command.

5. The machine-implemented method of claim 4, wherein the data preservation command comprises a program command for writing one or more of system data or acknowledged host data.

6. The machine-implemented method of claim 1, wherein:
   the suspend or terminate command is a suspend command; and
   the suspended non-critical memory command is resumed after a subsequent command is issued.

7. The machine-implemented method of claim 1, wherein:
   the suspend or terminate command is a terminate command; and
   the terminated non-critical memory command is not resumed after a subsequent command is issued.

8. The machine-implemented method of claim 1, wherein:
   the suspend or terminate command is a suspend command; and
   the suspend command comprises a predetermined prefix to allow restarting the suspended non-critical memory command.

9. The machine-implemented method of claim 1, wherein:
   the plurality of non-volatile memory devices and the determined at least one non-volatile memory device among the plurality of non-volatile memory devices belong to a first die or a first plane; and
   responsive to a new program command being issued, the new program command is sent to a second die or a second plane that is different from the first die or the first plane.

10. The machine-implemented method of claim 1, wherein:
    detecting whether the power fail event is triggered comprises detecting, that the power fail event is triggered, before an operating voltage level reaches a predetermined operating voltage threshold; and
    the method further comprises: writing data from a volatile memory to one or more non-volatile memory devices of the plurality of non-volatile memory devices, before the operating voltage level drops below the predetermined operating voltage threshold.

11. A data storage system, comprising:
    a plurality of non-volatile memory devices; and
    a controller configured to cause:
       detecting that a power fail event is triggered; and
       responsive to the power fail event being triggered:
          determining that at least one non-volatile memory device among the plurality of non-volatile memory devices is executing a first type of memory commands; and
          issuing a suspend or terminate command, to the determined at least one non-volatile memory device among the plurality of non-volatile memory devices, to suspend or terminate execution of the first type of memory commands.

12. The data storage system of claim 11, wherein the first type of memory commands comprises an erase command or a program command for writing a first type of data.

13. The data storage system of claim 12, wherein the first type of data comprises non-acknowledged host data.

14. The data storage system of claim 11, wherein the controller is further configured to cause:
    after issuance of the suspend or terminate command, issuing a data preservation command.

15. The data storage system of claim 14, wherein the data preservation command comprises a program command for writing one or more of system data or acknowledged host data.

16. The data storage system of claim 11, wherein:
the suspend or terminate command is a suspend command; and
the suspend command comprises a predetermined prefix to allow restarting the suspended first type of memory commands.

17. The data storage system of claim 11, wherein upon issuance of the suspend or terminate command, an amount of available non-volatile memory is greater than an amount of non-volatile memory available if the execution of the first type of memory commands is completed.

18. A system, comprising:
a plurality of non-volatile memory devices;
means for detecting that a power fail event is triggered;
means for determining, responsive to the power fail event being triggered, that at least one non-volatile memory device among the plurality of non-volatile memory devices is executing a first type of memory commands; and
means for issuing a suspend or terminate command, to the determined at least one non-volatile memory device among the plurality of non-volatile memory devices, to suspend or terminate execution of the first type of memory commands.

19. The system of claim 18, wherein the first type of memory commands comprises either an erase command, or a program command for writing non-acknowledged host data.

20. The system of claim 18, wherein:
the plurality of non-volatile memory devices and the determined at least one non-volatile memory device among the plurality of non-volatile memory devices belong to a first die or a first plane; and
the system further comprises means for sending, responsive to a subsequent command being issued, the subsequent command to a second die or a second plane, wherein the second die is different from the first die, and the second plane is different from the first plane.

* * * * *